United States Patent
Walas et al.

(10) Patent No.: US 11,900,934 B2
(45) Date of Patent: Feb. 13, 2024

(54) METHOD AND APPARATUS FOR AUTOMATICALLY EXTRACTING NEW FUNCTION OF VOICE AGENT BASED ON USAGE LOG ANALYSIS

(71) Applicant: Samsung Electronics Co., Ltd., Suwon-si (KR)

(72) Inventors: Marcin Walas, Warsaw (PL); Pawel Kubiak, Warsaw (PL); Wojciech Szmyd, Warsaw (PL); Bozena Lukasiak, Warsaw (PL)

(73) Assignee: Samsung Electronics Co., Ltd., Suwon-si (KR)

( * ) Notice: Subject to any disclaimer, the term of this patent is extended or adjusted under 35 U.S.C. 154(b) by 315 days.

(21) Appl. No.: 17/494,323

(22) Filed: Oct. 5, 2021

(65) Prior Publication Data

US 2022/0028386 A1 Jan. 27, 2022

Related U.S. Application Data

(63) Continuation of application No. PCT/KR2020/003306, filed on Mar. 10, 2020.

(30) Foreign Application Priority Data

Mar. 5, 2020 (KR) ........................ 10-2020-0027980

(51) Int. Cl.
*G10L 15/22* (2006.01)
*G06F 40/295* (2020.01)
(Continued)

(52) U.S. Cl.
CPC ............ *G10L 15/22* (2013.01); *G06F 40/295* (2020.01); *G10L 15/063* (2013.01);
(Continued)

(58) Field of Classification Search
CPC ....... G10L 15/22; G10L 15/02; G10L 15/063; G10L 15/1815; G10L 15/197;
(Continued)

(56) References Cited

U.S. PATENT DOCUMENTS 10,170,106 B2   1/2019  Gelfenbeyn et al.
10,431,219 B2  10/2019  Danila et al.
(Continued)

FOREIGN PATENT DOCUMENTS

JP    2019-084598 A    6/2019
KR  10-2018-0070684 A  6/2018
(Continued)

OTHER PUBLICATIONS

Devlin et al. "BERT: Pre-training of Deep Bidirectional Transformers for Language Understanding," arXiv:1810.04805v2 [cs.CL] May 24, 2019.

(Continued)

*Primary Examiner* — Yogeshkumar Patel
(74) *Attorney, Agent, or Firm* — Jefferson IP Law, LLP

(57) ABSTRACT

A method and apparatus for generating a new function of a voice agent, wherein usage logs of users of the voice agent may be analyzed to extract a set of utterances of the users with respect to a new function of the voice agent, proto capsules for the set of utterances are provided. The method includes based on the set of utterances, ranks of importance of the proto capsules may be determined, a vocabulary of a proto capsule having a higher rank than a preset criterion may be identified, and a source code stub for a new function of the voice agent corresponding to the proto capsule having the higher rank may be generated based on the identified vocabulary.

20 Claims, 5 Drawing Sheets

(51) Int. Cl.
   *G10L 15/06*   (2013.01)
   *G10L 15/18*   (2013.01)
   *G10L 15/197*  (2013.01)

(52) U.S. Cl.
   CPC ........ *G10L 15/1815* (2013.01); *G10L 15/197* (2013.01); *G10L 2015/227* (2013.01)

(58) Field of Classification Search
   CPC ..... G10L 15/1822; G10L 15/04; G10L 15/08; G10L 2015/227; G10L 2015/223; G06F 40/35; G06F 40/295; G06F 40/216; G06F 40/242; G06F 40/30
   See application file for complete search history.

(56) References Cited

U.S. PATENT DOCUMENTS

| | | | |
|---|---|---|---|
| 2008/0040339 A1* | 2/2008 | Zhou | G06F 16/3334 707/999.005 |
| 2017/0213545 A1 | 7/2017 | Kwon et al. | |
| 2018/0268818 A1 | 9/2018 | Schoenmackers et al. | |
| 2018/0329998 A1* | 11/2018 | Thomson | H04N 21/42203 |
| 2019/0034040 A1* | 1/2019 | Shah | G06F 3/0481 |
| 2019/0126488 A1 | 5/2019 | Sumiyoshi | |
| 2020/0027456 A1 | 1/2020 | Kim et al. | |
| 2020/0066255 A1* | 2/2020 | Madan | G06F 40/35 |
| 2022/0101848 A1 | 3/2022 | Zotto et al. | |

FOREIGN PATENT DOCUMENTS

| | | |
|---|---|---|
| KR | 10-2019-0131065 A | 11/2019 |
| KR | 10-2020-0006566 A | 1/2020 |
| KR | 10-2020-0013152 A | 2/2020 |

OTHER PUBLICATIONS

Cer et al. "Universal Sentence Encoder," arXiv:1803.11175v2 [cs.CL] Apr. 12, 2018.
Anonymous "Hierarchical clustering," https://en.wikipedia.org/wiki/Hierarchical_clustering (retrieved from Internet Oct. 5, 2021).
Anonymous "Language model," https://en.wikipedia.org/wiki/Language_model (retrieved from Internet Oct. 5, 2021).
Oliver et al. "TBXTools: A Free, Fast and Flexible Tool for Automatic Terminology Extraction," Proceedings of Recent Advances in Natural Language Processing, pp. 473-479, Hissar, Bulgaria, Sep. 7-9, 2015.
Nadeau et al. "A survey of named entity recognition and classification," Aug. 2007 Lingvisticæ Investigationes 30(1).
Gartenberg "Amazon opens up its crowdsourced Alexa Answers program to anyone," https://www.theverge.com/2019/9/12/20862460/amazon-crowdsourced-alexa-answers-fact-checking-questions Sep. 12, 2019 (retrieved from Internet Oct. 5, 2021).
International Search Report dated Nov. 25, 2020, issued in International Patent Application No. PCT/KR2020/003306.

* cited by examiner

FIG. 6

```
train (train ID) {
  utterance ("[g:CreateLovePoem] create a love poem")
  plan (plan_ID)
}
```

```
train (train ID) {
utterance ("[g:CreateLovePoem] create a (love)[v:term01]
poem")
  plan (plan_ID)
}
```

```
vocab(term01) {
"love",
[...]
}
```

720

METHOD AND APPARATUS FOR AUTOMATICALLY EXTRACTING NEW FUNCTION OF VOICE AGENT BASED ON USAGE LOG ANALYSIS

CROSS-REFERENCE TO RELATED APPLICATION(S)

This application is a continuation application, claiming priority under § 365(c), of an International application number PCT/KR2020/003306, filed on Mar. 10, 2020, which is based on and claims priority of a Korean patent application number 10-2020-0027980, filed on Mar. 5, 2020, in the Korean Intellectual Property Office, the disclosure of each of which is incorporated by reference herein in its entirety.

BACKGROUND

1. Field

The disclosure relates to a method and apparatus for generating a new function of a voice agent to improve a response of the voice agent (e.g., Samsung Bixby, Amazon Alexa, Google Assistant, etc.) to a voice of a customer, and more particularly, to a method and apparatus to extract a set of utterances of users of a voice agent with respect to a new function of the voice agent by analyzing usage logs of the users, generate proto capsules for the set of utterances based on the set of utterances, determine ranks of importance of the proto capsules, identify a vocabulary of a proto capsule having a rank higher than a preset criterion, and generate a source code stub for a new function of the voice agent corresponding to the proto capsule having the higher rank based on the identified vocabulary.

2. Description of Related Art

Recent conversational agents are based on an open community or a partially open community to form new functions. For example, there are communities such as "Alexa Skills Store" of Amazon Alexa and "Action on Google" of Google Assistant. Rapid increases in developed functions of both of these communities have been reported. An example of Samsung Bixby includes a community such as "Bixby Developers Portal."

As the range of functions of a voice agent increases, the number of usage logs also increases. Moreover, several tens of hundreds of available functions allow users to explore the range of the voice agent and to attempt a new function. In some cases, when a user makes a request beyond current functions of the voice agent, such an intention of the user is classified as "unsupported." For example, the voice agent may respond with: "I am not able to do that now." Such unsupported functions are increasingly demanded.

An existing voice agent developing community such as Amazon Alexa, Google Assistant, etc., employs a top-down approach, i.e., starting from a business demand and ending in an actual user. For example, assuming that the voice agent has a service function that provides information about a mountain trail, a new function of the voice agent may be generated to respond to information about a particular mountain trail such as popularity, difficulty, distance, etc. In a developing process, the new function may be developed using several function templates (e.g., Alexa Blueprints). The templates include general functions (including a source code) reflecting a general conversational pattern (e.g., information request, product ordering, etc.). In this approach, after a function is published, a usage log may be analyzed to improve a function in a predefined range. For example, a response may be adjusted to deal with more usage logs or provide better results (e.g., more accurate or concise results). This means that a voice of a customer such as a user community of the agent is considered in the latter stage of the developing process.

Moreover, the voice of the customer is sampled by market research such as a survey and an interview, a response of the customer is analyzed by a market researcher, and a new service is proposed based on a result of the analysis performed by the market researcher.

The above information is presented as background information only to assist with an understanding of the disclosure. No determination has been made, and no assertion is made, as to whether any of the above might be applicable as prior art with regard to the disclosure.

SUMMARY

Functions of a voice agent, such as capsules of Samsung Bixby, actions of Google Assistant, skills of Amazon Alexa, etc., are typically defined in view of business, and may be improved based on usage log feedbacks once they are published to the public.

With this approach, a developer community may miss several important functions attempted by users unaware of a limited range of the voice agent.

For example, when Samsung Bixby does not know how to write a "narrative essay," a user unaware of that situation may make a request such as, "Hi, Bixby, can you write a narrative essay for me?", "Hi, Bixby, can you recommend a topic for my narrative essay?", "Bixby, help me with my essay," etc.

In a top-down approach, such requests of users may not be properly handled because appropriate analysis is required before developers consider a new agent function.

A bottom-up approach may be a better resolution, which starts from feedback (usage logs) of users. For example, when there is an owner of a portal site regarding the "narrative essay," a corresponding function may be requested by a user of an agent through the bottom-up approach, such that the owner of the portal site may contribute to a voice agent community. That is, when it is determined based on usage logs that the narrative essay is requested by the user, the owner of the portal site regarding the narrative essay incorporates information about the portal site regarding the narrative essay in a function for the narrative essay, thus contributing to development of the corresponding function of the voice agent.

A popular alternative to the general top-down approach is based on a new function for a voice of a customer collected using a survey and an interview designed and analyzed by a market researcher. This approach is costly and is more customer-oriented than other top-down approaches, but the voice of the customer is considered in a very limited fashion. First, the voice of the customer is limited to a survey designed by the market researcher. Next, analysis of a demand of the customer is focused on a problem already familiar to an analyzer, and in this case, due to a personality of the analyzer and an absence of familiarity, a new function and service may be completely ignored.

Aspects of the disclosure are to address at least the above-mentioned problems and/or disadvantages and to provide at least the advantages described below. Accordingly, an aspect of the disclosure is to provide more freedom to a customer in expressing a demand of the customer and enable the customer to perform direct communication, thereby allowing a track which is not costly, is not limited to passive analysis of an intermediate level, and has a wide range between the demand of the customer and a service provider (a capsule developer).

More specifically, the disclosure proposes a method of supplementing a general developing process by automatically extracting a prototype of a function of a voice agent from all usage logs.

Additional aspects will be set forth in part in the description which follows and, in part, will be apparent from the description, or may be learned by practice of the presented embodiments.

In accordance with an aspect of the disclosure, a method for generating a new function of a voice agent proposed in the disclosure to solve the foregoing problem is provided. The method includes analyzing usage logs of users of a voice agent to extract a set of utterances of the users with respect to a new function of the voice agent, generating proto capsules for the set of utterances based on the set of utterances, determining ranks of importance of the proto capsules, identifying a vocabulary of a proto capsule having a higher rank than a preset criterion, and generating a source code stub for a new function of the voice agent corresponding to the proto capsule having the higher rank based on the identified vocabulary.

In accordance with another aspect of the disclosure, an apparatus for generating a new function of a voice agent proposed in the disclosure to solve the foregoing problem is provided. The apparatus includes a memory and at least one processor connected to the memory, in which the at least one processor is configured to extract a set of utterances of users of the voice agent with respect to the new function of the voice agent by analyzing usage logs of the users, generate proto capsules for the set of utterances based on the set of utterances, determine a rank of importance of each of the proto capsules, identify a vocabulary of a proto capsule having a rank higher than a preset criterion, and generate a source code stub for the new function of the voice agent corresponding to the proto capsule having the higher rank, based on the identified vocabulary.

In a process of generating a new function of a voice agent, usage logs of users of the voice agent may be analyzed to extract a set of utterances of the users with respect to a new function of the voice agent, proto capsules for the set of utterances may be generated based on the set of utterances, ranks of importance of the proto capsules may be determined, a vocabulary of a proto capsule having a higher rank than a preset criterion may be identified, and a source code stub for a new function of the voice agent corresponding to the proto capsule having the higher rank may be generated based on the identified vocabulary, thereby directly, accurately, and rapidly offering a function of the voice agent in response to a user's request and complementing a general developing process.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 is a view illustrating a source code stub for a new function of a voice agent, according to an embodiment of the disclosure; and FIG. 7 is a view illustrating a source code stub for a new function of a voice agent, according to an embodiment of the disclosure.

Throughout the drawings, it should be noted that like reference numbers are used to depict the same or similar elements, features, and structures.

BEST MODE

Figure 1:
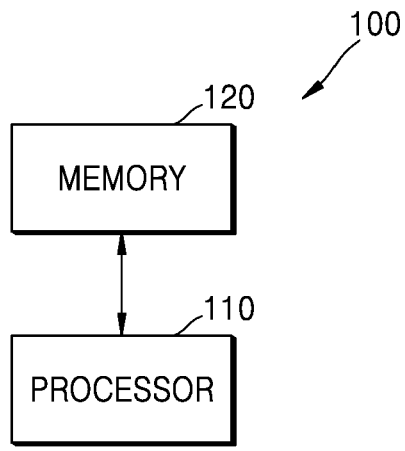
FIG. 1 is a block diagram of an apparatus for generating a new function of a voice agent, according to an embodiment of the disclosure.

According to an embodiment of the disclosure, a method of generating a new function of a voice agent includes analyzing usage logs of users of a voice agent to extract a set of utterances of the users with respect to a new function of the voice agent, generating proto capsules for the set of utterances based on the set of utterances, determining ranks of importance of the proto capsules, identifying a vocabulary of a proto capsule having a higher rank than a preset criterion, and generating a source code stub for a new function of the voice agent corresponding to the proto capsule having the higher rank based on the identified vocabulary.

According to an embodiment, the utterances of the users with respect to the new function of the voice agent may be utterances of the users input to the voice agent for an operation that may not be performed with an existing function of the voice agent.

According to an embodiment, the method of generating a new function of the voice agent may further include an operation of obtaining an identified intention of the proto capsule of the higher rank in which the source code stub may be generated based on the identified vocabulary and the identified intention.

According to an embodiment, the source code stub may be used to generate a new function of the voice agent.

According to an embodiment, the set of utterances may that the utterances having similar meanings are clustered as a group.

According to an embodiment, an operation of extracting a set of the utterances may be performed by an artificial intelligence language model.

According to an embodiment, a rank of importance of an utterance may be determined based on a frequency of the utterance.

According to an embodiment, the rank of importance of the utterance may be determined based on a language model trained for a usage log.

According to an embodiment, an operation of identifying the vocabulary may be performed by named entity recognition based on a library capsule.

According to an embodiment, an operation of identifying the vocabulary may be performed by automatic terminology extraction.

According to an embodiment, the source code stub may be generated in a preset format of the voice agent.

According to an embodiment of the disclosure, an apparatus for generating a new function of a voice agent may include a memory and at least one processor connected to the memory, in which the at least one processor is configured to extract a set of utterances of users of the voice agent with respect to the new function of the voice agent by analyzing usage logs of the users, generate proto capsules for the set of utterances based on the set of utterances, determine a rank of importance of each of the proto capsules, identify a vocabulary of a proto capsule having a rank higher than a preset criterion, and generate a source code stub for the new function of the voice agent corresponding to the proto capsule having the higher rank, based on the identified vocabulary.

According to an embodiment, the utterances of the users with respect to the new function of the voice agent may be utterances of the users input to the voice agent for an operation that may not be performed with an existing function of the voice agent.

According to an embodiment, the at least one processor may be further configured to additionally identify an intention of the proto capsule of the higher rank in which the source code stub may be generated based on the identified vocabulary and the identified intention.

According to an embodiment, the source code stub may be used to generate a new function of the voice agent.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although terms used herein are selected with general terms popularly used at present under the consideration of functions in the disclosure, the terms may vary according to the intention of those of ordinary skill in the art, judicial precedents, or introduction of new technology. In addition, in a specific case, the applicant voluntarily may select terms, and in this case, the meaning of the terms may be disclosed in a corresponding description part of the disclosure. Thus, the terms used in the disclosure should be defined not by the simple names of the terms but by the meaning of the terms and the contents throughout the disclosure.

Throughout the entirety of the specification of the disclosure, when it is assumed that a certain part includes a certain component, the term 'including' means that a corresponding component may further include other components unless specially described to the contrary.

The term "unit," as used herein, denotes a software or hardware component, which performs certain tasks. However, the meaning of "unit" is not limited to software or hardware. The "unit" may be configured to reside on the addressable storage medium and configured to execute on one or more processors. Thus, the "unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or further separated into additional components and "units."

According to an embodiment of the disclosure, the "unit" may be implemented as a processor and a memory. The term "processor" should be widely interpreted as including a general-purpose processor, a central processing unit (CPU), a microprocessor, a digital signal processor (DSP), a controller, a microcontroller, a state machine, etc. In several environments, the "processor" may indicate an on-demand semiconductor (an application specific integrated circuit (ASIC)), a programmable logic device (PLD), a field programmable gate array (FPGA), etc. The term "processor" may indicate, for example, a combination of a DSP and a microprocessor, a combination of a plurality of microprocessors, a combination of one or more microprocessors coupled with a DSP core, or a combination of processing devices such as a combination of other random such components.

The term "memory" should be broadly interpreted as including a random electronic component capable of storing electronic information. The term, memory, may indicate various types of processor-readable media, such as random access memory (RAM), read-only memory (ROM), non-volatile RAM (NVRAM), programmable ROM (PROM), erasable-programmable ROM (EPROM), electrically erasable PROM (EEPROM), flash memory, a magnetic or optical data storage device, registers, etc. When the processor is capable of reading information from and/or recording information in a memory, the memory may be referred to as being in a state of electronically communicating with the processor. The memory integrated in the processor is in the state of electronically communicating with the processor.

Hereinbelow, an "agent" may refer to a computer assistant using a natural language, for example, to play music, prepare for a meeting, search for information online, etc. Examples of the "agent" may include Samsung Bixby, Amazon Alexa, Google Assistant, Microsoft Cortana, Samsung S-Voice, Apple Siri, etc. This agent may be called a "conversational agent," a "voice agent," etc.

Hereinafter, a "capsule" may mean a capsulated high-level function of an agent configured with several intentions or functions. The capsule is used in a Samsung Bixby ecosystem, and is similar to the concept of "domain." The "capsule" may be, for example, "call" (management of a call), "e-mail" (management of an e-mail), "weather" (weather forecast information), "chatbot" (a chat service), etc. Corresponding terms may include an Alexa skill of Amazon Alexa, a Google action of Google Assistant, and a Cortana skill of Microsoft Cortana, and may be academically used as the term "domain."

Herein, the "proto capsule" may mean a partially generated capsule as a prototype of a capsule.

Herein, the "utterance" may mean a sentence input to a voice agent by a user. For example, an utterance such as "Hi, Bixby, I'd like to call my wife." may be input to the voice agent.

Herein, the "voice of a customer" may mean a feedback of the customer regarding an experience and expectation of the customer.

The "intention" may mean one action performed by an agent in a given capsule. For example, "calling at a certain number," etc., may be an intention of the capsule "call." The intention may be described by a set of utterances that should be processed by a given intention.

Herein, an apparatus and method of generating a new function of a voice agent according to an embodiment will be described with reference to FIGS. 1 to 7.

With reference to FIGS. 1 to 7, a description will be made of a method and apparatus in which all usage logs of users of a voice agent may be analyzed to extract a set of utterances of the users with respect to a new function of the voice agent, proto capsules for the set of utterances may be generated based on the set of utterances, ranks of importance of the proto capsules may be determined, a vocabulary of a proto capsule having a higher rank than a preset criterion may be identified, and a source code stub for a new function of the voice agent corresponding to the proto capsule having the higher rank may be generated based on the identified vocabulary.

FIG. 1 is a block diagram of an apparatus for generating a new function of a voice agent, according to an embodiment of the disclosure.

Referring to FIG. 1, an apparatus 100 for generating a new function of a voice agent according to an embodiment may include a memory 110 and at least one processor 120 connected to the memory 110. Operations of the apparatus 100 for generating a new function of a voice agent according to an embodiment may be performed by separate processors or under control of a central processor. The memory 110 of the apparatus 100 for generating a new function of a voice agent may store data received from outside and data generated by the processor, e.g., information about a set of utterances, information about a proto capsule, information about an intention of the proto capsule, information about a vocabulary of the proto capsule, information about a source code stub, etc.

The processor 120 of the apparatus 100 for generating a new function of a voice agent may analyze all usage logs of users of a voice agent to extract a set of utterances of the users with respect to a new function of the voice agent, generate proto capsules for the set of utterances based on the set of utterances, determine ranks of importance of the proto capsules, identify a vocabulary of a proto capsule having a higher rank than a preset criterion, and generate a source code stub for a new function of the voice agent corresponding to the proto capsule having the higher rank based on the identified vocabulary.

Figure 2:
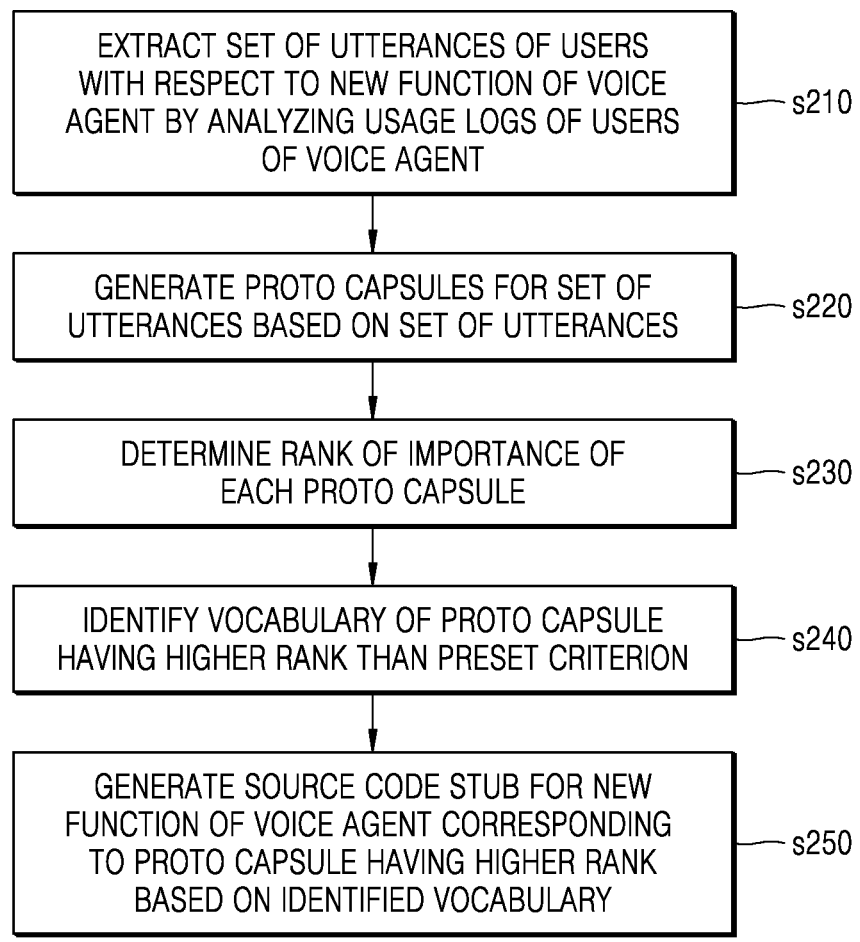
FIG. 2 is a flowchart of a method of generating a new function of a voice agent, according to an embodiment of the disclosure.

With reference to FIG. 2, a detailed description will be made of detailed operations of a method, performed by the apparatus 100 for generating a new function of a voice agent, for generating a new function of a voice agent according to an embodiment, including analyzing all usage logs of users of a voice agent to extract a set of utterances of the users with respect to a new function of the voice agent, generating proto capsules for the set of utterances based on the set of utterances, determining ranks of importance of the proto capsules, identifying a vocabulary of a proto capsule having a higher rank than a preset criterion, and generating a source code stub for a new function of the voice agent corresponding to the proto capsule having the higher rank based on the identified vocabulary.

FIG. 2 is a flowchart of a method of generating a new function of a voice agent, according to an embodiment of the disclosure.

Referring to FIG. 2, at operation s210, the apparatus 100 for generating a new function of a voice agent may extract a set of utterances of users with respect to a new function of the voice agent, by analyzing usage logs of the users of the voice agent.

According to an embodiment, the utterances of the users with respect to the new function of the voice agent may be utterances of the users input to the voice agent for an operation that cannot be performed with an existing function of the voice agent. When utterances requested by a user correspond to an operation that cannot be currently performed by the voice agent, the voice agent may respond as "unsupported." Such utterances may be extracted and used to generate a new function of the voice agent.

According to an embodiment, an operation of extracting a set of the utterances may be performed by an artificial intelligence (AI) language model. The artificial intelligence language model may include bidirectional encoder representations from transformers (BERT) or a universal sentence encoder for semantic similarity. The BERT may be an artificial intelligence language model trained for processing a natural language, and the universal sentence encoder for semantic similarity may be an artificial intelligence language model trained for determining semantic similarity of sentences.

According to an embodiment, the set of utterances may include that the utterances having similar meanings are clustered as a group. For example, the set of utterances may have been analyzed by an artificial intelligence language model and clustered as a group including semantically similar utterances.

According to an embodiment, usage logs of the users of the voice agent may be obtained from a server that manages voice agents.

At operation s220, the apparatus 100 for generating a new function of a voice agent may generate proto capsules for the set of utterances based on the set of utterances. A process of extracting an utterance from a usage log to generate a proto capsule will be described later with reference to FIG. 4.

At operation s230, the apparatus 100 for generating a new function of a voice agent may determine ranks of importance of the proto capsules.

According to an embodiment, a rank of importance of an utterance may be determined based on a frequency of the utterance. With a higher frequency of an utterance, a corresponding function may be requested more frequently by users.

According to an embodiment, the rank of importance of the utterance may be determined based on a language model trained for a usage log. The language model may quantize a probability of appearance of a word sequence unlike a natural language having uncertainty. More specifically, a language model trained based on usage logs of the voice agent may have a probability distribution based on which a word may be predicted. An index specifying how well such a probability distribution predicts a sample may be referred to as perplexity, and lower perplexity may indicate better sample prediction. Thus, for low aggregated perplexity of a proto capsule, a high rank of the proto capsule may be determined through the language model trained based on usage logs.

A process of determining a rank of importance of the proto capsule will be described later in detail with reference to FIG. 5.

At operation s240, the apparatus 100 for generating a new function of a voice agent may identify a vocabulary of a proto capsule with a higher rank than a preset criterion.

According to an embodiment, an operation of identifying a vocabulary may be performed by named entity recognition based on a library capsule. To automatically identify a vocabulary used by a new proto capsule, a named entity recognition method based on a library capsule such as time indication, position, proper name, etc., may be used. The named entity recognition method is a method in which words (named entities) corresponding to predefined person, company, place, time, unit, etc., are recognized and extracted from a document, and vocabularies included in the proto capsule may be identified based on a predefined library capsule.

According to an embodiment, an operation of identifying a vocabulary may be performed by automatic terminology extraction. By applying a preset calculation method through automatic terminology extraction, a vocabulary included in the proto capsule may be identified. The automatic terminology extraction may be a natural language processing method related to terminology used in identifying domain-related terminology applied to a method of using computers. This may be applied to a wide range of tasks such as ontology learning, machine learning, computer-assisted translation, thesaurus composition, classification, indexing, information retrieval, text mining, text summarization, etc. An example of the automatic terminology extraction may include a TBX tool, etc.

At operation s250, the apparatus 100 for generating a new function of the voice agent may generate a source code stub for a new function of the voice agent, which corresponds to the proto capsule having the higher rank, based on the identified vocabulary. The generated source code stub will be described in detail with reference to FIGS. 6 and 7.

According to an embodiment, the source code stub may be used to generate a new function of the voice agent.

According to an embodiment, the apparatus 100 for generating a new function of the voice agent may further include an operation of obtaining an identified intention of the proto capsule of the higher rank in which the source code stub may be generated based on the identified vocabulary and the identified intention.

An operation of obtaining the identified intention of the proto capsule having the higher rank may be performed to identify an intention to be carried out by the proto capsule. Identifying the intention to be carried out by the proto capsule may be a selective operation because of dealing with several hundreds of utterances by comparing several hundreds of millions of all usage logs. Several hundreds of utterances corresponds to the amount of data that may be manually and efficiently examined in an actual capsule developing process.

A scheme to identify the intention may include an additional clustering method, a method of determining semantic similarity through comparison with already-developed capsules (functions already contributing to a voice agent community), etc. The additional clustering method or the method of determining semantic similarity through comparison with additional clustering or already-developed capsules may be performed using an artificial intelligence language model.

First, the additional clustering method may involve clustering semantically similar utterances together. This is an utterly selective operation, such that a developer may manually agglomerate several utterance clusters to reduce a workload. In addition, additional clustering may be configured by a threshold value that permits cluster agglomeration. Once agglomerated, several clusters may be in practice excessively general and may have to be divided later by a developer, such that the threshold value may be empirically defined.

The method of determining semantic similarity through comparison with already-developed capsules may identify patterns partially reusable in other capsules (e.g., turning on or off a particular function, requesting purchase of something, and addition of a response appropriate for a general situation such as a confirmation prompt or a rejection prompt). In this sense, the proto capsule may be enriched with knowledge obtained from experiences about all capsules.

Intentions of the proto capsule may be automatically described by the latest cluster labelling technique. The most representative utterance to be a center of a given cluster in a given embedding space may be used.

Figure 3:
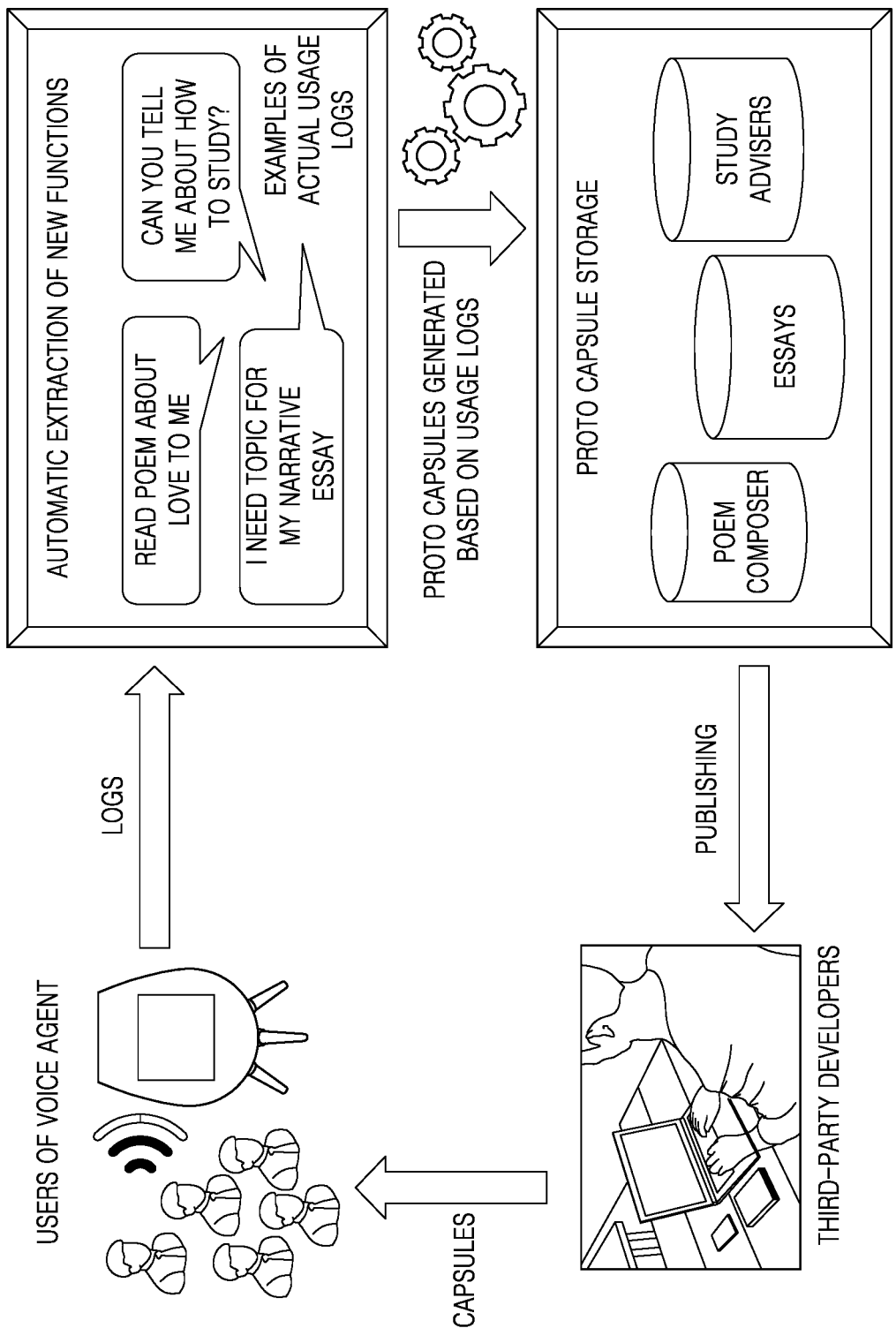
FIG. 3 illustrates a schematic process wherein a process of automatically extracting a new function of a voice agent from usage log analysis is included in a voice agent developing community, according to an embodiment of the disclosure.

FIG. 3 illustrates a schematic process wherein a process of automatically extracting a new function of a voice agent from usage log analysis is included in a voice agent developing community, according to an embodiment of the disclosure.

A proto capsule may be a template of a new function (capsule) of a voice agent, and this template may include specifications of a function and a source code stub that is a previously generated source code of a capsule.

Referring to FIG. 3, the proto capsule may be extracted from a usage log and published to a developer community. A developer may use the proto capsule for actual implementation of the new function. More specifically, new functions may be automatically extracted through usage logs of voice agent users. Examples of actual usage logs may include "Read a poem about love," "Propose how to study," "I need a topic for a narrative essay," etc. The proto capsule generated based on the usage logs may be stored in a proto capsule storage and published. A third-party developer may develop a capsule by using the published proto capsule and provide a capsule for a new function to a voice agent user.

Herein, for clarity, several technical operations (e.g., an operation related to a data privacy policy) may be omitted.

Figure 4:
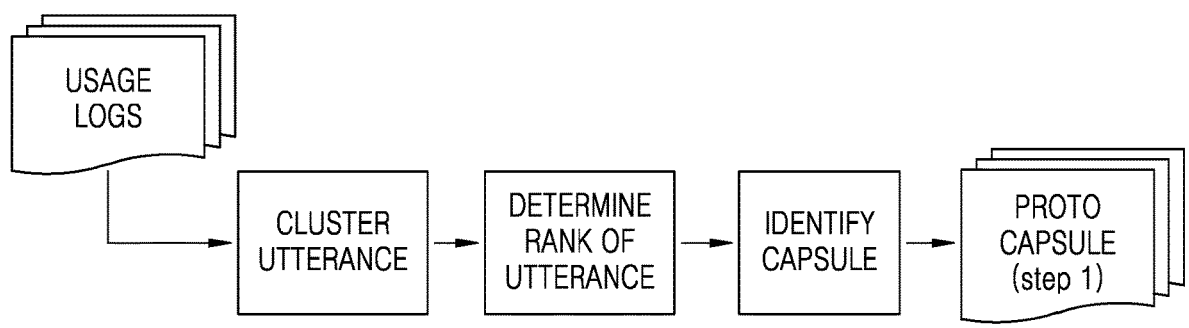
FIG. 4 is a view for describing a process of generating a proto capsule by extracting an utterance from a usage log, according to an embodiment of the disclosure.

FIG. 4 is a view for describing a process of generating a proto capsule by extracting an utterance from a usage log, according to an embodiment of the disclosure.

Referring to FIG. 4, by analyzing usage logs and extracting utterances, a capsule indicating a new function may be generated.

To analyze the usage logs and extract the utterances, BERT, a universal sentence encoder for semantic similarity, a clustering algorithm (in particular, agglomerative clustering), etc., may be used.

Utterances input to the voice agent may be clustered in a cluster belonging to one intention through agglomerative clustering from the usage logs of the voice agent. In this operation, multiple clusters may be related to the same intention.

The aggregated frequency of the clusters may be used to determine a rank of each utterance. In this process, the clusters may be allowed to include "long-tail" utterances. The "long-tail" utterances may mean utterances having low generation probability or low generation amount. That is, in spite of a lower rank of an utterance, the utterance may be included in a cluster according to a preset criterion. Setting a rank of an utterance may include discarding cluster candidates having unusual intentions.

Clustering may be used again, and clusters of clusters may be a proto capsule (i.e., a proto type) for a new function, and in this case, the new function may include utterances and an intention may not be yet defined.

Through this process, semantically similar utterances may be clustered into a group, and a proto capsule for the new function may be generated from a set of the utterances.

Figure 5:
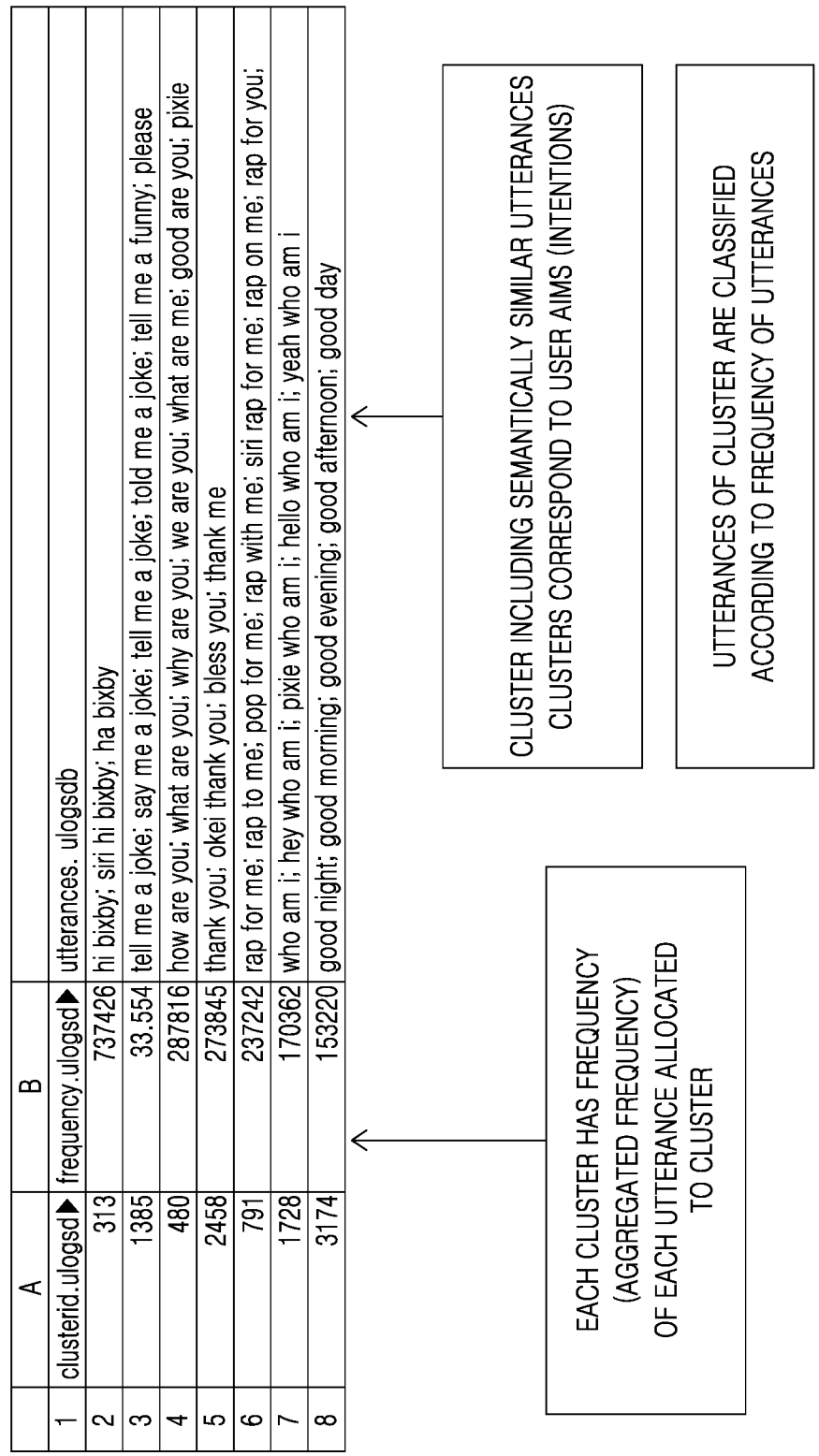
FIG. 5 is a view for describing a process of determining a rank of a proto capsule generated from a set of utterances according to an embodiment of the disclosure.

FIG. 5 is a view for describing a process of determining a rank of a proto capsule generated from a set of utterances of the disclosure.

Referring to FIG. 5, each cluster may have the aggregated frequency of each utterance allocated to each cluster, the cluster may include semantically similar utterances, and each cluster may correspond to a user purpose. Utterances of a cluster may be classified according to the frequency of clusters.

More specifically, to focus on the most important features, a rank of each proto capsule may be set. A method of setting a rank may be based on a language model learned for a frequency or usage log of utterances. In this way, proto capsules formed from rare (a low frequency of) utterances may be removed without dealing with an important part in a user ecosystem. Proto capsules that do not satisfy a predefined rank threshold value may not be included in the subsequent process. The rank may be used as a criterion for expecting the popularity of a proto capsule. That is, for a higher rank, after release of a proto capsule, the proto capsule may be popular among users.

FIG. 6 is a view illustrating a source code stub for a new function of a voice agent, according to an embodiment of the disclosure.

Referring to FIG. 6, in a corresponding voice agent development environment (e.g., a Bixby developing environment of Samsung Bixby), to start development of a new function, a source code stub generated for a proto capsule may be used. Details may depend on an actually used voice agent, but several operations may be common to a community based on a current existing voice agent.

Formalization of the voice agent may be implemented through learning about extracted utterances. Generation of a source code stub may include purely technically converting an utterance into a format allowed by a particular agent. For example, in case of Samsung Bixby, a sentence like "create a love poem" may be converted as shown in FIG. 6. Herein, CreateLovePoem may be a unique label of a cluster, and train_ID and plan_ID may be internal identifiers of a Samsung Bixby platform.

FIG. 7 is a view illustrating a source code stub for a new function of a voice agent, according to another embodiment of the disclosure.

Referring to FIG. 7, in formalization of a voice agent, annotating training may be based on a result of identifying a vocabulary. As technical conversion of a format acceptable by a particular voice agent, annotation may be included according to a result of identifying a vocabulary. For example, assuming that footnotes like "create a <term01>love</term01> poem" are added to an utterance "Create a love poem" by using automatic terminology extraction, "create a (love) [v:term01] poem" of a source code 710 for learning of FIG. 7 may be trained and a code 720 for a vocabulary may be added. Instead of the code 720 for the vocabulary, another code corresponding thereto may be added.

Herein, term01 is an artificial name for a vocabulary, and automatic labeling of the vocabulary may be added in a manner similar to clustering labeling. A label belongs to the same terminology, and may be a center of embedding of words or phrases to be identified.

A name of a vocabulary identified by named entity recognition may be defined by an entity type (e.g., a date, a geographical position, etc.).

The source code stub may be intended for the developer to download the source code stub and open and use the same in a voice agent developing tool (e.g., BixbyIDE for Samsung Bixby).

Thus, the source code stub for the proto capsule may be used by the developer to start implementation of an actual new function.

An ultimate aim of the voice agent is to respond to a user's request. Such a current aim may be achieved by a long procedure of generating a new function and analyzing a response of a customer. A method of generating a proto capsule by using usage logs may directly, accurately, and rapidly respond to the user's request. This may be achieved through the bottom-up approach based on the user's request. The proto capsule may satisfy expectation of a community of the user by including a voice of a customer in an early stage of generating a capsule, i.e., a function of the voice agent. In addition, the proto capsule may improve the working speed of the developer.

So far, the disclosure has been described with reference to the embodiments thereof. It would be understood by those of ordinary skill in the art that the disclosure may be implemented in a modified form without departing from the essential characteristics of the disclosure. Descriptions of features or aspects within each embodiment of the disclosure should typically be considered as available for other similar features or aspects in other embodiments of the disclosure. The range of the embodiments of the disclosure will be in the appended claims, and all of the differences in the equivalent range thereof should be understood to be included in the embodiments of the disclosure.

Meanwhile, the foregoing some embodiments of the disclosure may be written as programs executable on computers, and may be implemented on general-purpose digital computers operating the programs by using computer-readable recording medium. The computer-readable recording medium may include storage medium such as magnetic storage medium (e.g., ROM, floppy disks, hard disks, etc.), optical recording medium (e.g., compact disk (CD)-ROMs, digital versatile disks (DVDs), etc.), so forth.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of generating a new function of a voice agent, the method comprising:
    extracting a set of utterances of users of the voice agent with respect to the new function of the voice agent by analyzing usage logs of the users;
    generating proto capsules for the set of utterances based on the set of utterances;
    determining a rank of importance of each of the proto capsules;
    identifying a vocabulary of a proto capsule having a rank higher than a preset criterion; and
    generating a source code stub for the new function of the voice agent corresponding to the proto capsule having the higher rank, based on the identified vocabulary.

2. The method of claim 1, wherein the utterances of the users with respect to the new function of the voice agent comprise utterances of the users input to the voice agent for an operation that is unable to be performed with an existing function of the voice agent.

3. The method of claim 1, further comprising:
    obtaining an identified intention of the proto capsule having the higher rank,
    wherein the source code stub is generated based on the identified vocabulary and the identified intention.

4. The method of claim 3, wherein identifying the intention comprises one of an additional clustering method or a method of determining semantic similarity through comparison with already-developed capsules.

5. The method of claim 4, wherein the additional clustering method or the method of determining semantic similarity is performed using an artificial intelligence language model.

6. The method of claim 1, wherein the source code stub is used to generate the new function of the voice agent.

7. The method of claim 1, wherein the set of utterances is clustered into a group of utterances that are semantically similar to each other.

8. The method of claim 7, further comprising classifying utterances of a cluster according to a frequency of clusters.

9. The method of claim 1, wherein the extracting of the set of utterances comprises:
    generating the new function of the voice agent, the generating of the new function being performed by an artificial intelligence language model.

10. The method of claim 1, wherein the rank of importance is determined by a frequency of an utterance.

11. The method of claim 1, wherein the rank of importance is determined based on a language model trained for a usage log.

12. The method of claim 11, wherein the language model quantizes a probability of appearance of a word sequence.

13. The method of claim 11, wherein the language model is trained based on usage logs of the voice agent and comprises a probability distribution based on which a word may be predicted.

14. The method of claim 1, wherein the identifying of the vocabulary is performed by a named entity recognition method based on a library capsule.

15. The method of claim 14, wherein the named entity recognition method comprises a method in which named entities are recognized and extracted from a document.

16. The method of claim 1, wherein the identifying of the vocabulary is performed by an automatic terminology extraction method.

17. The method of claim 1, wherein the source code stub is generated in a preset format of the voice agent.

18. The method of claim 1, further comprising:
    extracting the proto capsule from a usage log; and
    publishing the proto capsule to a developer community.

19. An apparatus for generating a new function of a voice agent, the apparatus comprising:
    a memory; and
    at least one processor connected to the memory,
    wherein the at least one processor is configured to:
        extract a set of utterances of users of the voice agent with respect to the new function of the voice agent by analyzing usage logs of the users,
        generate proto capsules for the set of utterances based on the set of utterances,
        determine a rank of importance of each of the proto capsules,
        identify a vocabulary of a proto capsule having a rank higher than a preset criterion, and
        generate a source code stub for the new function of the voice agent corresponding to the proto capsule having the higher rank, based on the identified vocabulary.

20. The apparatus of claim 19, wherein the utterances of the users with respect to the new function of the voice agent comprise utterances of the users input to the voice agent for an operation that is unable to be performed with an existing function of the voice agent.

* * * * *